(12) United States Patent
Paulsen et al.

(10) Patent No.: US 8,932,480 B2
(45) Date of Patent: *Jan. 13, 2015

(54) STOICHIOMETRIC LITHIUM COBALT OXIDE AND METHOD FOR PREPARATION OF THE SAME

(75) Inventors: Jens M. Paulsen, Daejeon (KR); Sun Sik Shin, Daejeon (KR); Hong-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,706

(22) Filed: Dec. 15, 2010

(65) Prior Publication Data

US 2011/0309290 A1    Dec. 22, 2011

Related U.S. Application Data

(63) Continuation of application No. 11/688,636, filed on Mar. 20, 2007, now Pat. No. 7,883,644.

(30) Foreign Application Priority Data

Mar. 20, 2006  (KR) ........................ 10-2006-0025116
May 8, 2006    (KR) ........................ 10-2006-0040969

(51) Int. Cl.
  *H01M 4/88*    (2006.01)
  *C01G 51/00*   (2006.01)
  (Continued)

(52) U.S. Cl.
  CPC ............... *H01M 4/525* (2013.01); *C01G 51/42* (2013.01); *C01P 2002/77* (2013.01);
  (Continued)

(58) Field of Classification Search
  USPC .................... 252/182.1, 182.3, 500, 521.2; 429/208–231.95
  See application file for complete search history.

(56) References Cited

U.S. PATENT DOCUMENTS 4,302,518 A    11/1981  Goodenough et al.
6,582,854 B1   6/2003   Qi et al.
(Continued)

FOREIGN PATENT DOCUMENTS

CN    1515041 A    7/2004
CN    1565063 A    1/2005
(Continued)

OTHER PUBLICATIONS

Chen et al. "Studies of LiCoO2 coated with metal oxides" Electrochemical and Solid-State Letter, 2003, (6) 11, pp. A221-A224.
(Continued)

*Primary Examiner* — Khanh Tuan Nguyen
(74) *Attorney, Agent, or Firm* — Lerner, David, Littenberg, Krumholz & Mentlik, LLP

(57) ABSTRACT

The present invention provides a $LiCoO_2$-containing powder comprising $LiCoO_2$ having a stoichiometric composition via heat treatment of a lithium cobalt oxide and a lithium buffer material to make equilibrium of a lithium chemical potential there between; a lithium buffer material which acts as a Li acceptor or a Li donor to remove or supplement Li-excess or Li-deficiency, coexisting with a stoichiometric lithium metal oxide; and a method for preparing a $LiCoO_2$-containing powder. Further, provided is an electrode comprising the above-mentioned $LiCoO_2$-containing powder as an active material, and a rechargeable battery comprising the same electrode.

20 Claims, 9 Drawing Sheets

(51) Int. Cl.
*C01G 53/00* (2006.01)
*H01M 4/131* (2010.01)
*H01M 10/0525* (2010.01)
*H01M 4/505* (2010.01)
*H01M 4/04* (2006.01)
*H01M 4/525* (2010.01)
*H01M 4/36* (2006.01)

(52) U.S. Cl.
CPC ............ *C01P 2004/03* (2013.01); *C01G 53/50* (2013.01); *C01P 2006/40* (2013.01); *H01M 4/131* (2013.01); *H01M 10/0525* (2013.01); *H01M 4/505* (2013.01); *H01M 4/04* (2013.01); *C01G 51/50* (2013.01); *Y02E 60/122* (2013.01); *H01M 4/366* (2013.01)
USPC ................ 252/182.1; 252/182.2; 252/500; 252/521.2; 429/208; 429/223; 429/231.1; 429/231.3; 429/231.95

(56) References Cited

U.S. PATENT DOCUMENTS

| | | |
|---|---|---|
| 6,589,499 B2 | 7/2003 | Gao et al. |
| 7,235,193 B2 | 6/2007 | Park et al. |
| 7,384,706 B2 | 6/2008 | Suhara et al. |
| 7,883,644 B2 | 2/2011 | Paulsen et al. |
| 2002/0076613 A1 | 6/2002 | Lee et al. |
| 2002/0122985 A1 | 9/2002 | Sato et al. |
| 2002/0192552 A1 | 12/2002 | Lampe-Onnerud et al. |
| 2003/0108790 A1 | 6/2003 | Manthiram et al. |
| 2004/0076882 A1 | 4/2004 | Hosoya et al. |
| 2004/0110063 A1* | 6/2004 | Uchitomi et al. ............. 429/223 |
| 2004/0121234 A1 | 6/2004 | Le |
| 2004/0200998 A1 | 10/2004 | Park et al. |
| 2005/0281727 A1 | 12/2005 | Yoshizawa et al. |
| 2006/0105239 A1 | 5/2006 | Paulsen et al. |
| 2006/0257737 A1 | 11/2006 | Goh et al. |
| 2007/0218363 A1 | 9/2007 | Paulsen et al. |
| 2008/0008933 A1 | 1/2008 | Lampe-Onnerud |

FOREIGN PATENT DOCUMENTS

| | | | | |
|---|---|---|---|---|
| JP | 11067209 | | 3/1999 | |
| JP | 2000195517 A | | 7/2000 | |
| JP | 2002110251 A | | 4/2002 | |
| JP | 2002321921 A | | 11/2002 | |
| JP | 2003059490 A | | 2/2003 | |
| JP | 2003223887 A | | 8/2003 | |
| JP | 2003263978 A | | 9/2003 | |
| JP | 2003331843 A | | 11/2003 | |
| JP | 2006-331943 A | * | 12/2006 | ............. C01G 51/00 |
| JP | 2006331943 A | | 12/2006 | |
| KR | 20010047099 A | | 6/2001 | |
| KR | 20020024520 A | | 3/2002 | |
| KR | 20030034762 A | | 5/2003 | |
| KR | 20070095201 A | | 9/2007 | |
| WO | 03/092099 | | 11/2003 | |
| WO | 03092099 A1 | | 11/2003 | |
| WO | 2005/064715 | | 7/2005 | |

OTHER PUBLICATIONS

Nukuda, Development of a Lithium Ion Battery Using a New Cathode Material, Journal of Power Sources, 146 (2005) 611-616.

* cited by examiner

STOICHIOMETRIC LITHIUM COBALT OXIDE AND METHOD FOR PREPARATION OF THE SAME

CROSS-REFERENCE TO RELATED PATENT APPLICATIONS

This application is a continuation application of U.S. patent application Ser. No. 11/688,636, filed on Mar. 20, 2007, now U.S. Pat. No. 7,883,644 which claims priority from Korean Patent Application No. 10-2006-0025116 filed on Mar. 20, 2006, and Korean Patent Application No. 10-2006-0040969 filed on May 8, 2006, in the Korean Intellectual Property Office, the disclosures of which are incorporated herein in their entirety by reference.

FIELD OF THE INVENTION

The present invention relates to a lithium cobalt oxide having a stoichiometric composition, which can be used as a cathode active material for lithium rechargeable batteries.

BACKGROUND OF THE INVENTION

A report in 1980 that $LiCoO_2$ is useful for a cathode active material of lithium rechargeable batteries was followed by a lot of research, so $LiCoO_2$ was adopted by commercial enterprises as a cathode active material for lithium rechargeable batteries. But, the high cost of $LiCoO_2$ contributes significantly (about 25%) to the cost of the battery product. High competition presses producers of rechargeable lithium batteries to lower the cost.

The high cost of $LiCoO_2$ is caused by two reasons: First, the high raw material cost of cobalt, and second the high cost of establishing reliable quality management and ensuring perfect process control during large scale production.

Especially, the quality management and process control aim to achieve highly reproducible products having optimized properties, where the performance of every batch fluctuates very little from those optimum properties. High reproducibility and little fluctuations of the performance of $LiCoO_2$ are absolutely essential in current highly-automated high volume lithium battery production lines.

A major problem is that $LiCoO_2$ is a sensitive material. Small changes of production process parameters cause large fluctuations of the performance of the cathode product. So quality management and process control require much effort and high costs.

$LiCoO_2$ is a stoichiometric phase. Under normal conditions (for example 800° C. in air) no reliable indication for any Li:Co non-stoichiometry has been reported in the literature.

Only stoichiometric $LiCoO_2$ with a Li:Co ratio very near to 1:1 has properties which are suitable for the cathode active material of the commercial lithium batteries. If the Li content is higher than 1:1, $LiCoO_2$ will coexist with a secondary phase which contains the excess lithium and largely consists of $Li_2CO_3$. $Li_2CO_3$ impurities in the commercial $LiCoO_2$ cathode active material are highly undesirable. Such samples are known to show poor storage properties at elevated temperature and voltage. One typical test to measure the storage properties is storage of fully charged batteries at 90° C. for 5 hours.

If the cathode contains $Li_2CO_3$ impurities, this may result in strong swelling (increase of thickness) of polymer cells. Even the much stronger metal cases of prismatic cells may bulge.

If the Li content is lower than 1:1, then the cathode contains divalent cobalt, i.e. $LiCoO_2$ coexists with cobalt oxides. Lithium-deficient $LiCoO_2$ shows poor cycling stability at a high voltage (>4.3 V), especially at an elevated temperature It is speculated that the higher catalytic activity of divalent cobalt present in the cobalt oxide phase supports the undesired oxidation of an electrolyte on the surface of $LiCoO_2$. Alternatively, divalent cobalt might, especially at a high voltage, dissolve in the electrolyte, and undergo precipitation at the anode side, thereby damaging a solid electrolyte interphase (SEI) layer on the anode.

Only in a lab, it is easy to prepare stoichiometric $LiCoO_2$ practically free of $Li_2CO_3$ or $CoO_x$ impurities by simple heating of $LiCoO_2$. The high cycling stability of such cathodes (in coin cells) has been demonstrated in the literature. It is speculated that the good cycling stability is attributed to two effects: (1) At small scale (lab size samples) the excess lithium ($Li_2CO_3$) easily evaporates during sintering, and (2) Heating repairs any damage to the surface of $LiCoO_2$, which was caused by air exposure, probably by a reductive attack by hydrocarbons.

A similar re-heating of $LiCoO_2$ is not effective to solve the problems associated with the high temperature properties and cycling stability which may occur in the large scale production. First, large scale-produced $LiCoO_2$ has not a damaged surface. After production the product is usually filled into air tight packaging, so any damage caused by air exposure is practically absent. Second, on a large scale, excess lithium does not evaporate practically. Very small amounts of $Li_2CO_3$ can be decomposed because volatile phases exist with very small thermodynamic equilibrium partial pressure. At small partial pressure gas transport is very slow, so that only tiny amounts of $Li_2CO_3$ can be decomposed. If we deal with large samples then the gas transport is not sufficient to decompose significant amounts of $Li_2CO_3$.

The situation is different if $Li_2CO_3$ decomposes in the presence of a lithium acceptor (such as cobalt oxide). In this case the thermodynamic equilibrium partial pressure is high and the gas transport kinetics is fast enough to decompose $Li_2CO_3$.

More generally, it is very difficult or even impossible to prepare $LiCoO_2$ with the exact desired Li:Co ratio at large scale. If an excess of cobalt is used, then a cobalt oxide impurity remains. Unfortunately, small impurities of $CoO_x$ are practically impossible to be detected by standard quality control methods, but they are very important for the performance of the cathode. If an excess of lithium is used, lithium impurities remain due to the low evaporation at large scale. Even if the premixed ($Li_2CO_3$ and Co-oxide) powder would exactly have the desired Li:Co ratio, any inhomogeneity in the mixed powder would after sintering creates a powder with regions being lithium-rich and other regions being lithium-deficient. Additionally some $Li_2CO_3$ can melt before fully reacting with the Co-oxide, and the molten $Li_2CO_3$ would tend to separate downwards. This will cause a Li:Co gradient with Li-deficient sample at the top and Li-excess at the bottom of the sintering vessel. As a result, very small amounts of impurity phases ($Li_2CO_3$ or Co-oxide) are present.

Much previous art to improve properties of $LiCoO_2$ has been disclosed. Examples of such efforts are surface coating of $LiCoO_2$, doping of $LiCoO_2$ with other metal cations and the preparation of non-stoichiometric $LiCoO_2$ at a very high temperature. Each effort created some satisfactory results, but the results are not enough for a mass production process, and make another problem of the costs of additional processes.

SUMMARY OF THE INVENTION

The invention discloses that a property fluctuation of $LiCoO_2$ in a mass-production process is primarily caused by the difference of lithium chemical potential of LiCoO$_2$, and robust LiCoO$_2$ less sensitive to process parameters can be prepared by co-firing LiCoO$_2$ and a solid state lithium buffer material to adjust a stoichiometric composition of lithium and cobalt to a desired range.

Conventional LiCoO$_2$ that is mass-produced has a problem in that little deviation of the composition from the desired stoichiometry results in significant fluctuation of a lithium chemical potential. If the lithium chemical potential is fixed within a given range, it is possible to achieve excellent high-voltage cycling properties and storage properties of LiCoO$_2$ even under high temperature conditions on the mass production scale.

Therefore, the present invention has been made in view of the above problems, and it is an object of the present invention to provide a powder comprising LiCoO$_2$ having a stoichiometric composition via heat treatment of a lithium cobalt oxide and a lithium buffer material to make equilibrium of the lithium chemical potential therebetween, a method for preparing the same, the above-mentioned lithium buffer material, an electrode comprising the above-mentioned LiCoO$_2$-containing powder as an active material, and a rechargeable battery comprising the same electrode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
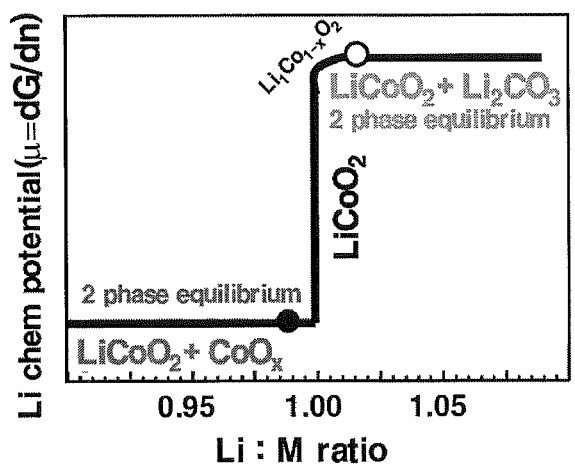
FIG. 1 is a thermodynamic schematic diagram of lithium chemical potential of LiCoO$_2$.

In accordance with an aspect of the present invention, the above and other objects can be accomplished by the provision of a powder comprising LiCoO$_2$ having a stoichiometric composition via heat treatment of a lithium cobalt oxide and a lithium buffer material to make equilibrium of a lithium chemical potential therebetween.

In accordance with another aspect of the present invention, there is provided a LiCoO$_2$-containing powder having a constant lithium chemical potential, wherein LiCoO$_2$ coexists with a lithium buffer material under equilibrium conditions of the lithium chemical potential therebetween, and the lithium chemical potential of powder is higher than the equilibrium lithium chemical potential between LiCoO$_2$ and a cobalt oxide and is lower than the equilibrium lithium chemical potential between LiCoO$_2$ and Li$_2$CO$_3$.

In accordance with a further aspect of the present invention, there is provided a lithium buffer material which acts as a Li acceptor or Li donor to thereby remove Li-excess or supplement Li-deficiency, which coexists with a stoichiometric lithium metal oxide.

In accordance with a still further aspect of the present invention, there is provided a method for preparing a LiCoO$_2$-containing powder, comprising a step of providing a homogeneous mixture of LiCoO$_2$ and a lithium buffer material; and a step of heating the resulting mixture to make an equilibrium of a lithium chemical potential.

In accordance with yet another aspect of the present invention, there is provided an electrode comprising the above-mentioned LiCoO$_2$-containing powder as an active material, and a rechargeable battery comprising the same electrode.

Hereinafter, the present invention will be described in more detail.

<Lithium Chemical Potential>

Generally, the chemical potential can be defined as the changes in a characteristic thermodynamic state functions (internal energy, enthalpy, Gibbs free energy, and Helmholtz free energy) with respect to the change in the number of moles of a particular constituent, depending on the experimental conditions. The chemical potential can be expressed by the following equation, under the conditions of constant temperature and constant pressure:

$$\mu_i = \left(\frac{\partial G}{\partial N_i}\right)_{T,p,N_{j \neq i}}$$

wherein μ is a chemical potential, G is Gibbs free energy, N is the number of molecules, T is a temperature and p is pressure.

Therefore, the chemical potential is regarded as the energy state of each material in the specific system. If two different materials with different chemical potential coexist in the same system, the reaction takes place in order to lower the sum of potentials, and the two materials equilibrate to the same potential.

In the present invention, "i" is lithium, "j" is oxygen, but by a special thermodynamic operation called Lagrange transformation "j" is replaced by p(j) which is the oxygen partial pressure. Other "j" (Mn, Co, Ni.) are "frozen", definition of which will be made hereinafter.

The thermodynamic equilibrium state of two or more different stoichiometric compounds requires the same chemical potential therebetween. If $LiCoO_2$ coexists with impurity materials ($Li_2CO_3$ or $CoO_x$), it can be considered that there is the state of chemical potential equilibrium between $LiCoO_2$ and individual impurities. As shown in FIG. 1, $Li_2CO_3$ has a higher lithium chemical potential than $LiCoO_2$ and $CoO_x$ has a lower chemical potential than $LiCoO_2$. As a result, if the composition of $LiCoO_2$ deviates from the stoichiometry (1:1), each equilibrium potential profile exhibits a stepwise gradient, not a continuous form.

Generally, mass-produced $LiCoO_2$ is somewhat lithium-excess or lithium-deficient, as discussed hereinbefore. The lithium chemical potential of such a product has always a higher value equilibrated with $Li_2CO_3$, or a lower value equilibrated with $CoO_x$. Therefore, the mass-produced $LiCoO_2$ is difficult to have a proper value between the upper and the lower chemical potentials (the potential of Li:Co=1:1 composition).

$LiCoO_2$ free of bulk impurity phases ($Li_2CO_3$ or $CoO_x$) still has surface defects. This is because defects diffuse out of the crystallites and accumulate at the surface. As a result, the surface is lithium-deficient, then the lithium chemical potential is low. Alternatively, the surface can be lithium-rich, then the lithium chemical potential is high.

The present invention provides a $LiCoO_2$-containing powder having a constant lithium chemical potential, via the heat treatment of $LiCoO_2$ and a material functioning as a Li acceptor and/or a Li donor to bring about equilibrium of the lithium chemical potential therebetween, whereby the lithium chemical potential of $LiCoO_2$ is higher than the equilibrium lithium chemical potential between $LiCoO_2$ and a cobalt oxide and is lower than the equilibrium lithium chemical potential between $LiCoO_2$ and $Li_2CO_3$.

That is, the phrase "preferred range of a lithium chemical potential of $LiCoO_2$" as used herein refers to a chemical potential which is higher than the equilibrium potential between $LiCoO_2$ and a cobalt oxide and is lower than the equilibrium potential between $LiCoO_2$ and $Li_2CO_3$.

If $LiCoO_2$ having a fixed chemical potential in the preferred range is used as a cathode active material of lithium rechargeable batteries, it is advantageously possible to achieve excellent cycling stability at a high voltage.

The lithium chemical potential cannot be easily measured. It is not directly related to the open circuit voltage (OCV) of an electrical cell at ambient temperature. The OCV is the lithium potential in a "frozen" cobalt-oxygen lattice framework. As used herein, the term "frozen" refers to a temperature which is low enough to prevent a thermodynamic equilibration within a limited time. The entropy of a crystalline substance is zero at the absolute zero of temperature (0 K), thereby exhibiting completely different thermodynamic behavior.

[Reaction Scheme 1]

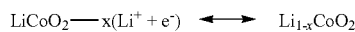

Contrary, the lithium chemical potential at room temperature is dominated by the transition metal composition and the lithium stoichiometry, and furthermore it is related to the conditions during preparation.

As discussed before, the performance properties of commercial $LiCoO_2$ as the electrode active material depend very sensitively on the exact Li:Co ratio. Upon slight deviation from the exact Li:Co ratio, the strong change in properties of $LiCoO_2$ is caused by the step-like change of lithium chemical potential. Accordingly surface properties, which dominate the storage and high-voltage cycling properties, change stepwise as well.

Obviously, it would be preferable to eliminate the step-like change of the lithium potential, and to fix the potential within a preferred region. Then a small deviation of lithium stoichiometry away from the optimum stoichiometric value would only cause a small change of the lithium chemical potential, as a result surface properties would be only scatter slightly from the optimum and generally, a more robust cathode material less sensitive to changes of the composition is achieved. Such a robust cathode material can then be prepared at high quality and low cost with less requirements regarding perfect process control and quality management as will be disclosed in the following.

<A Method for Equilibrating the Lithium Chemical Potential by the Present Invention>

Figure 2:
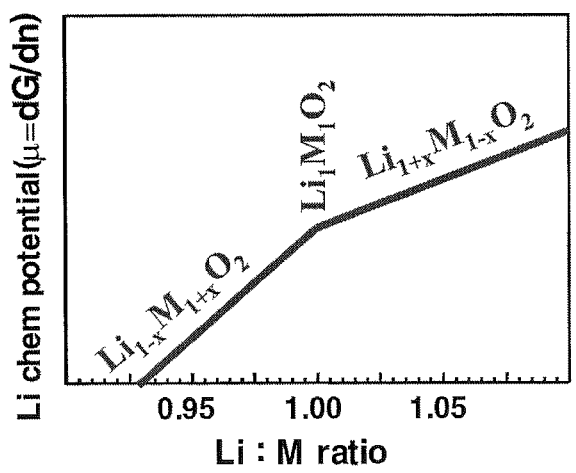
FIG. 2 is a thermodynamic schematic diagram of lithium chemical potential of Li buffer (LiMO$_2$)

FIG. 2 shows an illustrative example explaining some basic thermodynamic properties of a solid state lithium buffer such as $LiMn_{1/3}Ni_{1/3}Co_{1/3}O_2$.

Being a buffer means that it can act as a lithium acceptor and/or a lithium donor, and that the lithium chemical potential varies little with lithium stoichiometry, and that the absolute value of a slope of a chemical potential versus lithium stoichiometry is much smaller than that of lithium metal oxide which would be removed or supplemented with Li.

If the Li:M ratio in $LiMO_2$ as the solid state lithium buffer is 1:1, basically Mn is tetravalent, Co is trivalent and Ni is divalent. If the sample is lithium-rich, $Li_{1+x}M_{1-x}O_2$, a portion of Ni has a trivalent state. If the sample is lithium-deficient, $Li_{1-x}M_{1+x}O_2$, a portion of Mn changes from 4 to 3 valent state, or a portion of Co changes from 3 to 2 valent state. The changes of valence state occur within the same crystallographic layer structure and enable achievement of a wide stoichiometric range. Because of the wide stoichiometric range, the changes of lithium chemical potential within a limited region are not significant.

A mixture of $LiCoO_2$ with a solid state lithium buffer such as $LiMO_2$ (for example, $M=Mn_{1/3}Ni_{1/3}Co_{1/3}$) does not react (i.e. it does not equilibrate) at ambient temperature. Therefore, all $LiCoO_2$ particles in the mixture maintain a low or high lithium chemical potential, and the buffer particles have a potential determined by the lithium stoichiometry of the buffer.

During heating of the mixture a reaction takes place as follows. At a medium temperature, possibly above 200° C., the lithium becomes very mobile. This is not sufficient for the equilibration of the lithium chemical potential because the buffer reaction involves a change of transition metal valence state. This is also accompanied by an uptake or release of gas phase oxygen. At a higher temperature, possibly above 400° C., the oxygen becomes mobile, but the transition metal cations are still frozen. Now the lithium chemical potential and the oxygen potential equilibrate. At that temperature, the buffer can consume lithium by decomposition of $Li_2CO_3$ impurities, or it can release lithium to lithiate the cobalt oxide impurities. Finally, the lithium chemical potential of $LiCoO_2$ equilibrates at the buffer potential.

At much higher temperatures (>>1000° C.), the transition metal cations become mobile, and can therefore react with $LiCoO_2$ to form a new material.

The present invention discloses $LiCoO_2$ which is co-fired with a lithium buffer serving as the Li acceptor or Li donor, at a temperature above 400° C., i.e. at a temperature which is high enough to achieve an equilibration of lithium and oxygen. Otherwise the temperature is low enough (below 1000° C.) so that the transition metal has not fully equilibrated. As a result, stoichiometric $LiCoO_2$, free of $Li_2CO_3$ or cobalt oxide impurities and coexisting with the lithium buffer, is achieved. The lithium chemical potential of $LiCoO_2$ is fixed at the lithium buffer potential. The buffer is chosen so that the lithium potential of $LiCoO_2$ is fixed within a preferred region.

Figure 3:
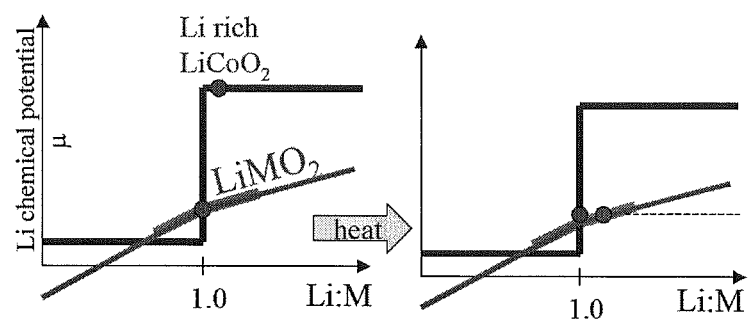
FIG. 3 is a thermodynamic schematic diagram which shows an equilibrium state of lithium chemical potential between Li-excess LiCoO$_2$ and Li buffer (LiMO$_2$)

FIG. 3 is a schematic diagram which shows a thermodynamic equilibrium state of a mixture of $LiCoO_2$ (having a small lithium excess) with a lithium buffer $LiMn_{1/3}Ni_{1/3}Co_{1/3}O_2$. Initially, the lithium potential is different in $LiCoO_2$ and buffer. During the equilibration process, the buffer consumes lithium (by decomposition of the $Li_2CO_3$ impurities) until stoichiometric $LiCoO_2$ is achieved, and the lithium chemical potential is equilibrated and fixed within the preferred region.

Figure 4:
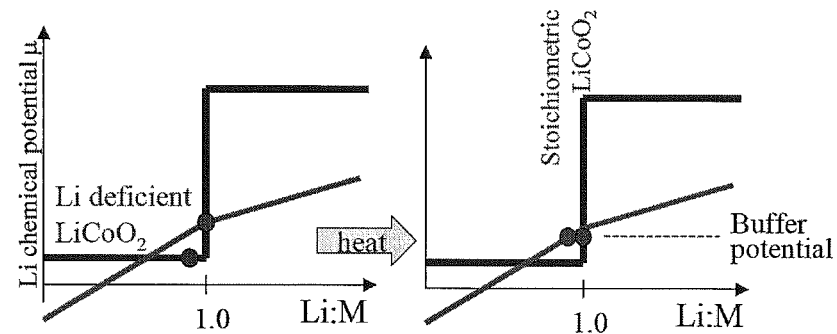
FIG. 4 is a thermodynamic schematic diagram which shows an equilibrium state of lithium chemical potential between Li-deficient LiCoO$_2$ and Li buffer (LiMO$_2$)

FIG. 4 is a schematic diagram which shows a thermodynamic equilibrium state of a mixture of lithium-deficient $LiCoO_2$ with a lithium buffer $LiMn_{1/3}Ni_{1/3}Co_{1/3}O_2$. Initially, the lithium potential is different in $LiCoO_2$ and buffer. During equilibration, the buffer delivers lithium (to lithiate the cobalt oxide) until stoichiometric $LiCoO_2$ is achieved, and the lithium chemical potential is equilibrated and fixed within the preferred region.

<Selection of Solid State Lithium Buffer Material>

Lithium buffer materials may serve as lithium acceptors and/or lithium donors. Lithium donating properties are required to lithiate $CoO_x$ impurities to form $LiCoO_2$. Lithium donators are known in the art. Non-limiting examples of the lithium donors are lithium-containing oxides such as $Li_2MnO_3$. Otherwise lithium accepting properties are required to decompose excess $Li_2CO_3$ impurities. Mild lithium acceptors, strong enough to decompose $Li_2CO_3$ but not strong enough to delithiate $LiCoO_2$, are also known in the art. Non-limiting examples of the lithium acceptors may include $TiO_2$ (reacting to form $Li_2TiO_3$), $ZrO_2$ ($\rightarrow Li_2ZrO_3$), $Al_2O_3$ ($\rightarrow LiAlO_2$), $MnO_2$ ($\rightarrow Li_2MnO_3$), $LiMn_2O_4$ ($\rightarrow Li_2MnO_3$), etc. These compounds can be generalized as oxides which are able to form double oxides with $Li_2O$.

Other examples of lithium-accepting compounds donate anions, preferably fluorine or phosphate ions, which trap excess lithium thereby forming stable lithium salts. Non-limiting examples of such compounds are $MgF_2$ ($\rightarrow 2LiF+MgO$), $Li_3AlF_6$, $AlPO_3$ ($\rightarrow Al_2O_3+Li_3PO_4$) and transition metal-based phosphates (such as $Co_3(PO_4)_2$ and $LiCoPO_4$) etc. Such lithium acceptors may be effective to decompose $Li_2CO_3$ impurities, but they cannot lithiate $CoO_x$ impurities. Additionally, these compounds are electrochemically inert, that means they do not contribute to the reversible capacity. Only small amounts of inert compounds, typically below 1% by weight, should be added, otherwise the specific reversible capacity of the final cathode will be too low.

The solid state lithium buffer of the present invention preferably has a lithium-accepting ability and a lithium-donating ability at the same time. Preferably, the solid state lithium buffer of the present invention also has a high reversible capacity. Preferred examples of the lithium buffers according to the present invention may be lithium transition metal oxides of Formula $Li_zMO_2$ (0.95<z<1.1; $M=Ni_{1-x-y}Mn_xCo_y$, 0<y<0.5, and a ratio of Mn to Ni (x/(1−x−y)) is in a range of 0.4 to 1.1).

Specifically, for example, the lithium transition metal composite oxides comprising nickel, manganese and cobalt, such as $LiMn_{1/3}Ni_{1/3}Co_{1/3}O_2$ and $LiNi_{0.55}Mn_{0.3}Co_{0.15}O_2$, are preferred because they act as lithium donators as well as lithium acceptors, and additionally, because they can be added in larger quantities (>1% by weight, typically 10% by weight or more) without causing deterioration of the reversible capacity of the final cathode material.

In the present invention, an amount of the solid state lithium buffer is preferably less than 30% by weight of the total weight of the powder. That is, the preferred content of $LiCoO_2$ in the electrode active material is more than 70% by weight.

The minimum amount of the lithium buffer is at least 1 mol %, more typically at least 10 mol %. For example, if $LiCoO_2$ has 0.25 mol % impurity of $Li_2CO_3$, then adding about 1 mol % of $LiMO_2$, followed by co-sintering yields impurity-free $LiCoO_2$ coexisting with lithium-rich $Li_{1+x}M_{1-x}O_2$ (approximate composition $Li_{1.2}M_{0.8}O_2$).

Alternatively, a proper amount of lithium-deficient $Li_{1-x}M_{1+x}O_2$ may be added as the solid state lithium buffer. Alternatively, adding 10 mol % of $LiMO_2$ to $LiCoO_2$ with 0.25 mol % impurity of $Li_2CO_3$ would result in $LiCoO_2$ coexisting with slightly lithium-rich $Li_{1+x}M_{1-x}O_2$ (approximate composition $Li_{1.025}M_{0.975}O_2$).

It is recommended to add a sufficient amount of the solid state lithium buffer (or to adjust the initial lithium stoichiometry) to achieve a preferred lithium stoichiometry of the buffer after co-sintering. If the lithium content of the lithium buffer in the final product is too low or too high, then generally the electrochemical properties of the buffer (for example, reversible capacity) are less.

For example, if $LiMO_2$ with $M=Mn_{1/3}Ni_{1/3}Co_{1/3}$ or $M=Ni_{0.55}Mn_{0.3}Co_{0.15}$ is used as the lithium buffer material, the lithium stoichiometry of the buffer after the heat treatment should be within a desired range otherwise the electrochemical properties deteriorate. Slightly lithium-rich $Li_{1+x}M_{1-x}O_2$ (x<0.04) and stoichiometric $LiMO_2$ as wells as slightly lithium-deficient $Li_{1-x}M_{1+x}O_2$ (x<0.03) are also within this preferred range. Even though the above-mentioned preferred range cannot be exactly defined, it seems that the value of x=−0.03, +0.04 in the final lithium buffer is definitely within this range.

It is preferred to ensure that the lithium chemical potential of the solid state lithium buffer matches the lithium chemical potential of $LiCoO_2$ and is in the preferred range which is higher than the equilibrium potential between $LiCoO_2$ and a cobalt oxide and is lower than the equilibrium potential between $LiCoO_2$ and $Li_2CO_3$. As an example: The preferred Li:M ratio for $LiMO_2$ with a high content of nickel (>80%) is 1:1. However, at this composition the lithium chemical potential is too high. Otherwise, the lithium chemical potential of lithium manganese spinel is lower than the equilibrium potential between $LiCoO_2$ and the cobalt oxide corresponding to a lower limit of the above-mentioned optimal range. Therefore, spinel is a too strong lithium acceptor which will decompose $LiCoO_2$.

The electrode active material in the present invention is not limited to a specific form as long as $LiCoO_2$ contacts with the lithium buffer (material serving as the lithium acceptor and/or the lithium donor). In the simplest case, the electrode active material is in the powder form. Typically, the $LiCoO_2$ powder and the solid lithium buffer powder are mixed, followed by heat treatment (co-firing).

In one preferred embodiment, the heat-treated mixture is a co-fired mixture of an oxide powder (a) of $LiCoO_2$ and a lithium transition metal oxide powder (b) of Formula $Li_zMO_2$ (0.95<z<1.1; $M=Ni_{1-x-y}Mn_xCo_y$, 0<y<0.5, and a ratio of Mn to Ni (x/(1−x−y)) is in a range of 0.4 to 1.1). Herein, the oxide powder (a) is monolithic particles having D50 of more than 10 μm, and the oxide powder (b) is agglomerated particles having D50 of less than 10 μm.

Generally, where a particle size of the electrode active material is larger, this may lead to a decrease in a surface area for reaction with an electrolyte inside a battery cell, thereby causing significant deterioration of high-voltage storage properties and rate properties and consequently decreasing a particle diameter of the active material. On the other hand, the electrode active material with a large particle diameter exhibits relatively high structural stability including high-temperature properties and decrease of side reactions including electrolyte decomposition, as compared to the active material having a small particle diameter.

However, it was surprisingly confirmed that the co-fired mixture according to the present invention maintains a desired level of excellent high-voltage storage properties, even though the oxide powder (a) has a large particle diameter of more than 10 μm. As described before, this is because $LiCoO_2$ having a stoichiometric composition or a mixture having a proper lithium chemical potential can be obtained, due to buffering effects of the $Li_zMO_2$ powder (b) as the lithium buffer material, on the $LiCoO_2$ powder (a), during heat treatment.

Alternatively, the solid state lithium buffer can be added in powder form, dispersed in a solution, or it can be dissolved in the solution.

Instead of a simple mixing of powders, more complex preparation routes might allow not only to improve cycling and storage properties, but also achieve improvement of the safety. Generally, it is known that $LiCoO_2$ has poor safety and Mn-containing $LiMO_2$ has better safety. Therefore, if a portion of the buffer covers the $LiCoO_2$ surface, the safety could be improved.

For example, fine particles of $LiMO_2$ may be coated on the surface of the $LiCoO_2$ particles. A typical method would involve spray-coating or dry-coating of small, preferably monolithic $LiMO_2$ particles (1-3 μm) onto larger $LiCoO_2$ particles (5-20 μm). During sintering, not only the $Li_2CO_3$ and $CoO_x$ impurities are consumed, and the lithium chemical potential is fixed within the preferred region, but also the small $LiMO_2$ particles become strongly attached to the $LiCoO_2$ surface and effectively cover a large fraction of the $LiCoO_2$ surface.

Alternatively, a layer of transition metal hydroxide or transition metal carbonate can be coated onto the $LiCoO_2$ by precipitation, using the $LiCoO_2$ particles as seeds. After eventually adding further lithium and sintering, not only the impurities are consumed, and the lithium chemical potential is fixed within the preferred region, but additionally a dense thick layer of electrochemically active $LiMO_2$ effectively covers the $LiCoO_2$ surface.

<Heat-Treatment>

After addition of the lithium buffer to $LiCoO_2$, a heat treatment follows. In some cases, additional additives may be added before the heat treatment. The additives may be sources of additional lithium (such as $Li_2CO_3$ and $LiOH.H_2O$), or the additives may extract lithium and supply fluorine (such as $MgF_2$ and $Li_3AlF_6$), or the additives may be materials suitable to modify the surface of the particles (for example, sintering agents)

The heat treatment typically is made in air, or alternatively it can be carried out in controlled, oxygen-containing gases with a poor oxygen content or in mixed gas of oxygen and nitrogen.

The heat treatment is carried out at a proper temperature. A suitable temperature range for the heat treatment is 400 to 1100° C., more preferably 500 to 950° C. A temperature of less than 400° C. might be too low. At such a low temperature, the equilibration of lithium potential between the lithium buffer and the $LiCoO_2$ may require an unreasonable long time. If the temperature exceeds 500° C., the equilibration of lithium potential between $LiCoO_2$ and lithium buffer and also the necessary equilibration of the oxygen potential usually occur at reasonable kinetics. If the heat treatment is carried out at a very high temperature exceeding 1100° C., this may undesirably result in significantly increased process costs. That is, the heat treatment at the very high temperature suffers from high costs for installation of high temperature equipment, large consumption of energy, and a need for additional processing steps such as grinding and sieving of sintered cakes. Additionally, at such temperatures not only the lithium and oxygen potentials equilibrate, but also the transition metal diffusion becomes significant, thus resulting in a doped $LiCoO_2$.

If the lithium buffer is $LiMn_{1/3}Ni_{1/3}Co_{1/3}O_2$ for example, dominantly cobalt from the $LiCoO_2$ would diffuse into the $LiMO_2$, and less Mn—Ni from the $LiMO_2$ would diffuse into the $LiCoO_2$, resulting in a phase mixture of two $LiCo_{1-x}(Mn-Ni)_xO_2$ phases, one with x>0.333 and the other with x≅0.

<Preparation of Electrode and Rechargeable Batteries>

An electrode comprising the $LiCoO_2$ material according to the present invention as an electrode active material can be prepared by a conventional method known in the art. For example, the electrode in the present invention may use an electrical conducting material for providing electric conductivity, and a binder for adhesion between the electrode material and a current collector, in addition to such an active material.

A paste is prepared by mixing the above-prepared electrode active material, 1 to 30 wt % of the electrical conducting material and 1 to 10 wt % of the binder in a dispersion solvent, followed by stirring. A laminated electrode structure is prepared by applying the resulting electrode paste to a metal sheet current collector, and pressing and drying the resulting structure.

A general example of the electrical conducting material is carbon black. The products sold in market may include various acetylene black series (available from Chevron Chemical Company and Gulf Oil Company), Ketjen Black EC series (available from Armak Company), Vulcan XC-72 (available from Cabot Company) and Super P (available from MMM Company).

Representative examples of the binders may include polytetrafluorethylene (PTFE), polyvinylidene fluoride (PVdF) or a copolymer thereof, and cellulose.

Representative examples of the dispersion solvents may include isopropyl alcohol, N-methylpyrolidone (NMP) and acetone.

The metal sheet for the current collector should be a highly electrical conductive metal to which the paste can be easily attached. Further the metal sheet should be non-reactive in the range of a working voltage of cells. If that condition is satisfied, any metal sheet can be used. Representative examples of the metal sheets may be mesh or foil of aluminum or stainless steel.

The present invention provides a rechargeable battery comprising the electrode of the present invention. The rechargeable battery of the present invention can be prepared by a conventional method known in the art, which is not particularly limited. For example, the battery can be fabricated by interposing a separator between the cathode and the anode and introducing a non-aqueous electrolyte into the resulting electrode assembly. The electrode, separator, electrolyte, and optionally additives known in the art can be used.

A porous separator can be used as a separator upon fabrication of the battery. Specific examples of the porous separator may include, but are not limited to, polypropylene series, polyethylene series, and polyolefin series.

The non-aqueous electrolyte for the rechargeable battery of the present invention contains a cyclic carbonate and/or a linear carbonate. Examples of the cyclic carbonate may include ethylene carbonate (EC), propylene carbonate (PC), and gamma butyrolactone (GBL). Examples of the linear carbonate may include diethyl carbonate (DEC), dimethyl carbonate (DMC), ethylmethyl carbonate (EMC), and methylpropyl carbonate (MPC). The non-aqueous electrolyte for the rechargeable battery of the present invention contains a lithium salt in conjunction with the carbonate compound. Specific examples of the lithium salt may include $LiClO_4$, $LiCF_3SO_3$, $LiPF_6$, $LiBF_4$, $LiAsF_6$ and $LiN(CF_3SO_2)_2$.

EXAMPLES

Now, the present invention will be described in more detail with reference to the following examples. These examples are provided only for illustrating the present invention and should not be construed as limiting the scope and spirit of the present invention.

Reference Example 1

Preparation and Characterization of $LiCoO_2$ with Li-Excess or Li-Deficiency

This reference example is intended to demonstrate that an electrochemical property of $LiCoO_2$, particularly the cycling stability at a high voltage, sensitively depends on the Li:Co ratio.

Commercially available $LiCoO_2$ was purchased from a low-cost supplier and used as a precursor material for this experiment. Three $LiCoO_2$ samples ($Li^-$, Li0 and $Li^+$) were prepared from the precursor. Samples $Li^-$ and $Li^+$ were in an amount of about 1 kg, and Sample Li0 was approx. 100 g.

The lithium-deficient sample $Li^-$ was prepared by immersing 1 kg of $LiCoO_2$ into water, resulting in a total of 2 L slurry. 7.6 g of concentrated $Li_2SO_4$ was added with stirring the slurry. Three different reactions took place after addition of acid: (1) decomposition of $Li_2CO_3$ impurities, (2) dissolution of divalent cobalt, and (3) ion exchange (ion leaching) of Li ions with $H^+$ ions on the surface region of $LiCoO_2$ particles. Initially the pH dropped to about 2, but slowly increased to about 6 after 30 minutes. The powder was recovered by filtration. After drying the powder at 180° C., the above procedure was repeated.

ICP analysis of the thus-filtered solution showed that total approx. 2.5 mol % lithium and 0.6 mol % cobalt were extracted from $LiCoO_2$. In this manner, a lithium cobalt oxide ($LiCoO_2$) with an approximate composition of $Li_{0.98}CoO_2$ was obtained. The lithium-deficient $Li_{0.98}CoO_2$ was heated at 750° C. for 10 hours.

The approx. stoichiometric sample, Li0, was prepared by heating the precursor $LiCoO_2$ at 850° C. for 10 hours. A small amount (100 g) of a sample was used to allow for evaporation of eventual excess lithium impurities.

The lithium-rich sample $Li^+$ was prepared from 1 kg of inexpensive $LiCoO_2$ by adding 1.5 mol % ball-milled $LiOH.H_2O$ per 1 mol cobalt followed by a heat treatment at 750° C. for 10 hours in air.

X-ray diffraction (XRD) analysis showed that all of 3 samples basically had the same XRD pattern. Particularly, the lattice constants were identical therebetween. The pH titration of the samples $Li^-$, Li0 and $Li^+$ revealed that $Li^-$ and Li0 were basically free of $Li_2CO_3$ impurities, whereas $Li^+$ contained about 1% by weight of $Li_2CO_3$. Sample $Li^+$ would not be suitable for commercial batteries because the $Li_2CO_3$ impurities would cause un-acceptable amounts of gas (for example causing swelling of polymer cells) during charging the battery.

The samples were subjected to electrochemical tests by coin cells at 3.0-4.2, 3.0-4.4 or 3.0-4.5 V and at room temperature (25° C.) or elevated temperature (50° C.). A typical schedule involved 32 cycles: a charge rate was C/5. During Cycles 1-5, a discharge rate performance was measured (C/10, C/5, C/2, 1 C and 2 C). Cycles 6-30 were carried out at a C/5 discharge rate to investigate the cycling stability. Cycle 31 was carried out at a C/10 discharge rate to investigate the remaining capacity, and Cycle 32 was carried out at a C/1 discharge rate to measure the capacity loss (impedance built-up) at a high-rate discharge.

Figure 5:
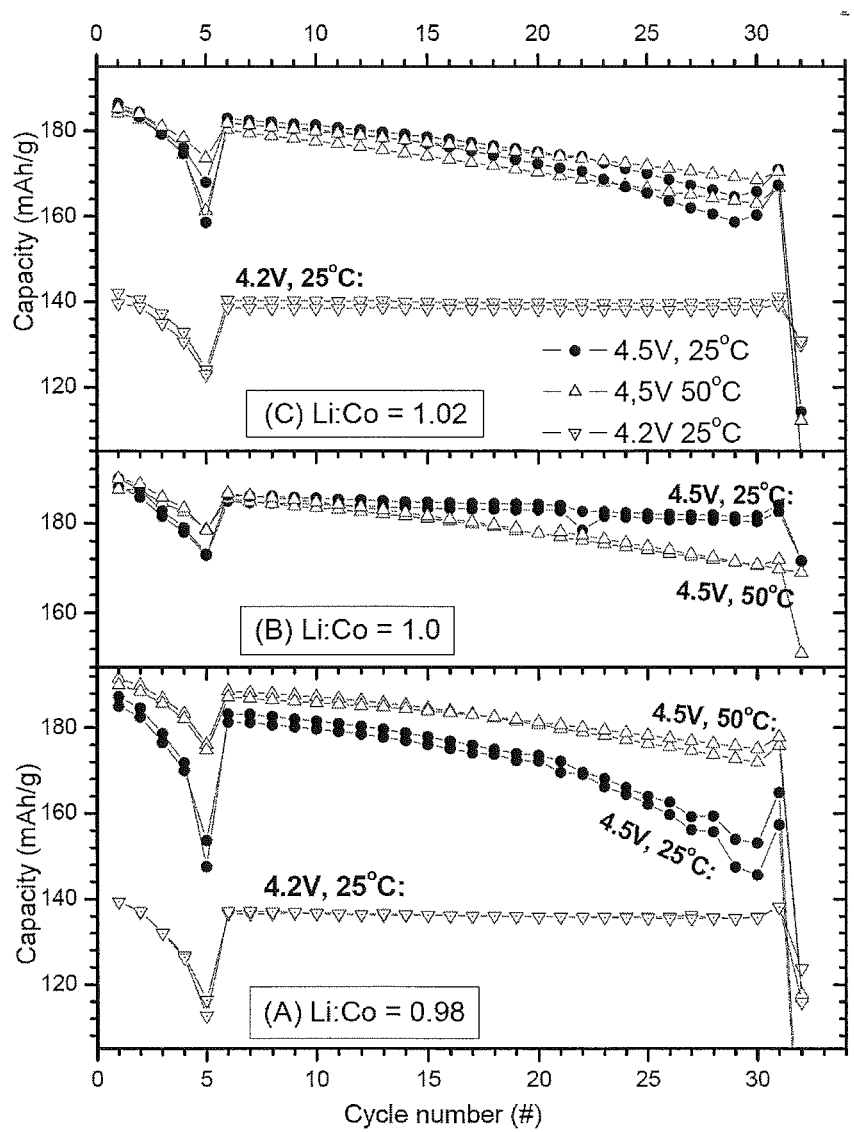
FIG. 5 is a graph showing cycling stability of LiCoO$_2$ at a different Li:Co ratio in Reference Example 1.

All samples showed an excellent cycling stability at 4.2 V, but exhibited a strong capacity fading at 4.5 V, especially for the Li-deficient sample. Significant impedance built-up was observed in the lithium-deficient and lithium-rich samples. Details are shown in FIG. 5, and Table 1 below summarizes the results.

TABLE 1

| Sample | Capacity (mAh/g) 25□, C/5 | | Capacity fading (% per 100 cycles) | | | |
|---|---|---|---|---|---|---|
| (Li:M target) | 4.2 V 25□ | 4.5 V 50° C. | 4.2 V 25° C. | 4.5 V 50° C. | Comment | Li:M |
| $Li^-$ (0.98:1) | 136 | 186 | 2.5 | >70 | Poor rate | Too low |
| Li0 (1.00:1) | 138 | 186 | 2.2 | 8.4 | — | — |
| $Li^+$ (1.02:1) | 139 | 183 | 2.2 | >50 | — | Too high |

Discussion: The data show that the cycling stability of $LiCoO_2$ at a high voltage dramatically changes even with a slight changes of a Li:Co ratio. The high-voltage cycling stability (and storage properties at high temperatures) is dominated by surface properties. The surface chemical properties depend on the chemical potential. Because the lithium chemical potential changes stepwise, the high-voltage cycling stability also changes stepwise. If the lithium chemical potential is fixed within a preferred region (according to the present invention), the high-voltage cycling stability can be improved.

Reference Example 2

Properties of Lithium Buffer $LiMn_{1/3}Ni_{1/3}Co_{1/3}O_2$ as Li Acceptor

The reference example is intended to confirm that $LiMn_{1/3}Ni_{1/3}Co_{1/3}O_2$ is a lithium acceptor.

This is proven by mixing $LiMn_{1/3}Ni_{1/3}Co_{1/3}O_2$ with a small amount of $Li_2CO_3$ (total Li:M=1.025:1), followed by a cooking step at 900° C. X-ray diffraction (XRD) analysis showed the following results.

(1) All $Li_2CO_3$ was consumed. This fact was also confirmed by pH titration. That is, after immersing the sample into water, the remaining $Li_2CO_3$ impurities were dissolved in water and detected by pH titration.

(2) The lattice constants ($a_{hex}$, $c_{hex}$, and the unit cell volume) of the final sample (2.8602 Å, 14.2302633 Å, and 33.60586 Å) were smaller than those of the initial LiMn$_{1/3}$Ni$_{1/3}$Co$_{1/3}$O$_2$ (2.8620 Å, 14.23688 Å and 33.66297 Å). These results confirm that lithium originating from the Li$_2$CO$_3$ has been introduced into the crystal lattice structure, resulting in Li$_{1+x}$M$_{1-x}$O$_2$. (see also Reference Example 4 for the relationship between stoichiometry and lattice constant).

Discussion: If LiMn$_{1/3}$Ni$_{1/3}$Co$_{1/3}$O$_2$ is added to LiCoO$_2$ with small amounts of Li$_2$CO$_3$ impurities, followed by co-sintering, then the Li$_2$CO$_3$ impurities are consumed, the LiMO$_2$ buffer is lithiated to give Li$_{1+x}$M$_{1-x}$O$_2$ and the lithium chemical potential of LiCoO$_2$ is fixed at the same value as Li$_{1+x}$M$_{1-x}$O$_2$ which is below the high value for LiCoO$_2$ coexisting with Li$_2$CO$_3$.

Reference Example 3

Properties of Lithium Buffer LiMn$_{1/3}$Ni$_{1/3}$Co$_{1/3}$O$_2$ as Li Donor

This example is intended to demonstrate that LiMn$_{1/3}$Ni$_{1/3}$Co$_{1/3}$O$_2$ is not a overly strong lithium acceptor and can also act as a lithium donor.

LiCoO$_2$ and MOOH (M=LiMn$_{1/3}$Ni$_{1/3}$Co$_{1/3}$) were mixed in a 5:3 ratio. The resulting mixture was pressed into the pellets. After co-sintering of the pellets at 800° C. for 1 day, X-ray diffraction (XRD) analysis was carried out on the sintered materials and Rietveld refinement was made. The refinement yielded the following conclusions:

1) Co$_3$O$_4$, LiCoO$_2$ and Li-M-O$_2$ coexist.

2) The lattice constants and the unit cell volume of the final Li-M-O$_2$ were slightly larger than those of LiMn$_{1/3}$Ni$_{1/3}$Co$_{1/3}$O$_2$. That is, the final Li-M-O$_2$ exhibited a small lithium deficiency. Using the data of Reference Example 4 allows to estimate the composition as approx. Li$_{1-x}$M$_{1+x}$O$_2$ with x≈.025 (Li:M≈0.95).

Applying basic thermodynamic considerations confirms that the lithium chemical potential of LiMn$_{1/3}$Ni$_{1/3}$Co$_{1/3}$O$_2$ is above the low value of LiCoO$_2$ coexisting with cobalt oxide impurities. Conclusion: LiMn$_{1/3}$Ni$_{1/3}$Co$_{1/3}$O$_2$ acts as the lithium donor to lithiate Co$_3$O$_4$ impurities.

Reference Example 4

Relationship Between the Stoichiometry and the Crystal Lattice of Lithium Buffer LiMn$_{1/3}$Ni$_{1/3}$Co$_{1/3}$O$_2$ This reference example is intended to investigate the stoichiometry-lattice relation of the lithium buffer LiMn$_{1/3}$Ni$_{1/3}$Co$_{1/3}$O$_2$.

Commercial LiMn$_{1/3}$Ni$_{1/3}$Co$_{1/3}$O$_2$ with an approximate Li:M ratio of 1:1 was used as a precursor. Two lithium-rich samples Li$_{1+x}$M$_{1-x}$O$_2$ with target Li:M=1.025:1 and 1.075:1 were prepared by adding Li$_2$CO$_3$ to the precursor material and reacting the resulting mixture at 900° C. for 24 hours in air. Two lithium-deficient samples Li$_{1-x}$M$_{1+x}$O$_2$ with target Li:M=0.975:1 and 0.925:1 were prepared by adding a mixed hydroxide (MOOH, M=Mn$_{1/3}$Ni$_{1/3}$Co$_{1/3}$) to the precursor material and reacting the resulting mixture at 900° C. for 24 hours in air.

Figure 6:
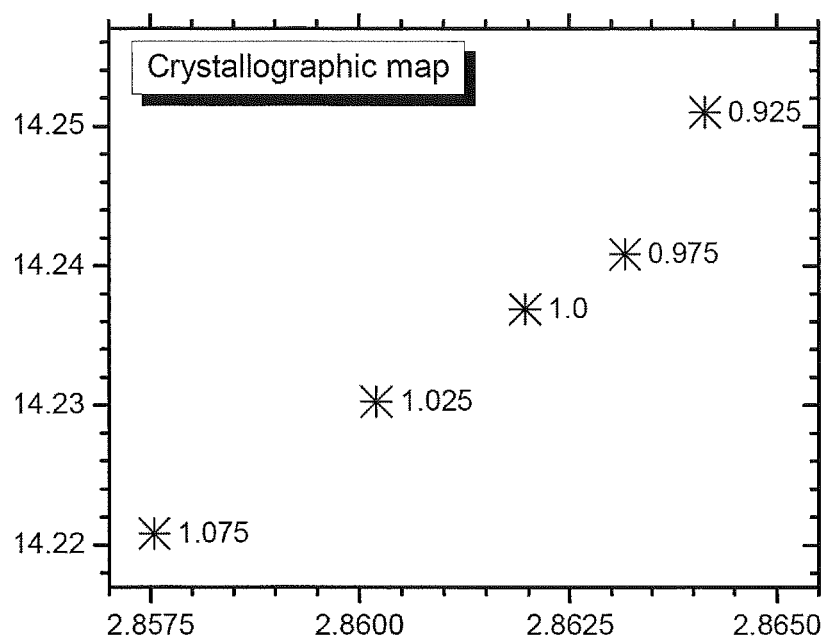
FIG. 6 is a crystallographic map of solid state lithium buffer Li(Mn$_{1/3}$Ni$_{1/3}$Co$_{1/3}$)O$_2$ in Reference Example 4.

X-ray diffraction (XRD) analysis showed a gradual and smooth change of a crystal lattice constant as a function of lithium stoichiometry. Data are given in Table 2 below. The same data are also shown in FIG. 6.

TABLE 2

| Li:M | Preparation | hex a (Å) | hex c (Å) | c: a/√24 | Vol (Å$^3$) |
|---|---|---|---|---|---|
| 0.925:1 | Added MOOH | 2.8642 | 14.251 | 15.65043 | 33.74779 |
| 0.975:1 | Added MOOH | 2.8632 | 14.24084 | 15.2743 | 33.70063 |
| 1.0:1.0 | As received | 2.8620 | 14.23688 | 15.41883 | 33.66297 |
| 1.025:1 | Added Li$_2$CO$_3$ | 2.8602 | 14.23026 | 15.57188 | 33.60586 |
| 1.075:1 | Added Li$_2$CO$_3$ | 2.8575 | 14.22082 | 15.84287 | 33.52114 |

The above results of Reference Examples 2-4 confirm those of the schematic FIG. 2 to FIG. 4.

Conclusion: LiMn$_{1/3}$Ni$_{1/3}$Co$_{1/3}$O$_2$ is a suitable solid state lithium buffer. It is able to donate as well as to accept lithium. The buffer potential matches LiCoO$_2$ potential and is within the preferred region. It has a wide non-stoichiometric range.

Reference Example 5

Electrochemical Properties of Lithium Buffer LiMn$_{1/3}$Ni$_{1/3}$Co$_{1/3}$O$_2$ This example discloses further properties of the solid state lithium buffer LiMn$_{1/3}$Ni$_{1/3}$Co$_{1/3}$O$_2$.

Figure 7:
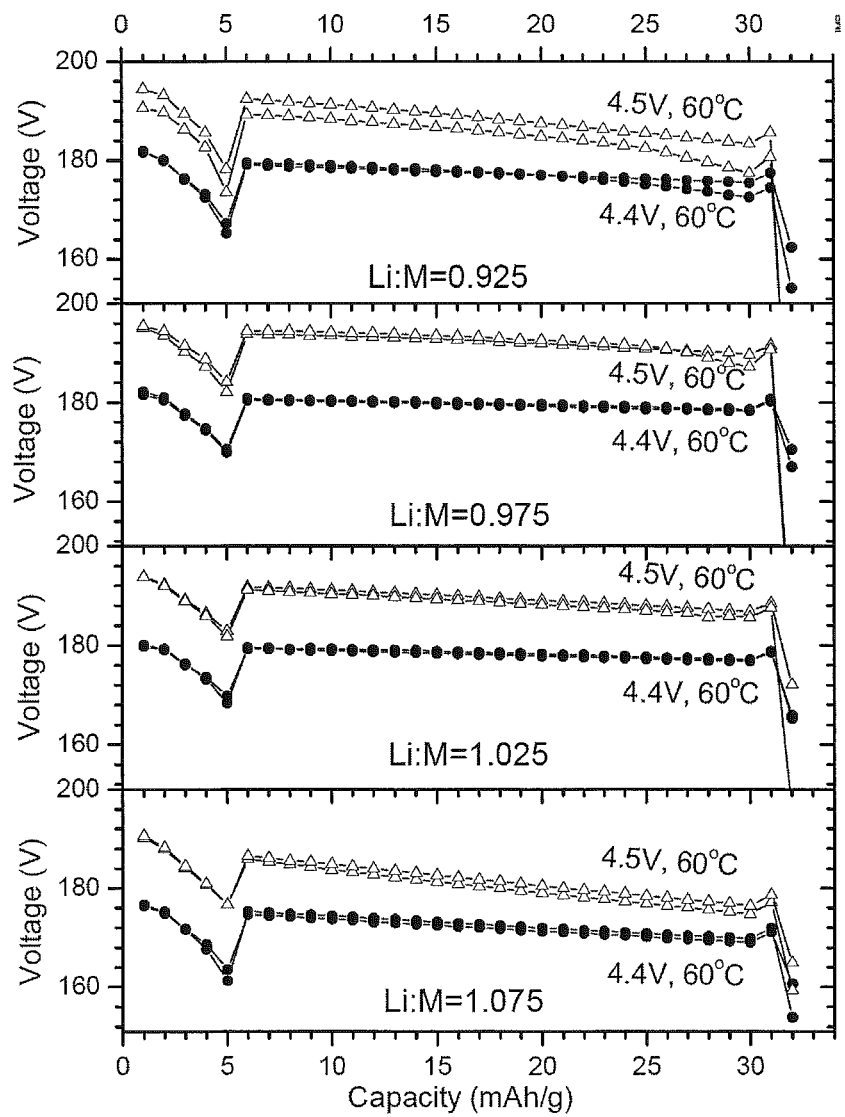
FIG. 7 is a graph showing cycling stability of solid state lithium buffer Li(Mn$_{1/3}$Ni$_{1/3}$Co$_{1/3}$)O$_2$ in Reference Example 5.

Electrochemical properties of the samples of Reference Example 4 were tested. Coin cells (with a Li metal anode) were prepared and were tested at 25° C. and 60° C. The charging voltage was 4.4, 4.5 and 4.6 V. Table 3 below summarizes the obtained results. FIG. 7 shows some of the results.

TABLE 3

| Sample (Li:M target) | Capacity (mAh/g) 3.0-4.4 V, C/5 | | Fading @ 60° C. % per 100 cycles | | | Comment | Li:M |
|---|---|---|---|---|---|---|---|
| | 25° C. | 60° C. | 4.4 V | 4.5 V | 4.6 V | | |
| 0.925:1 | 164 | 179 | 8.4 | 18 | 56 | Low rate | Too low |
| 0.975:1 | 167 | 180 | 4.7 | 13 | 53 | — | OK |
| 1:1 | 167 | 179 | 4.6 | 11 | 54 | — | OK |
| 1.025:1 | 168 | 178 | 4.8 | 10 | 56 | — | OK |
| 1.075:1 | 163 | 174 | 10.9 | 22 | 75 | High fading | Too high |

Within a relatively broad preferred region (about 0.975:1 to 1.025:1) excellent cycling stability was achieved. The sample with high lithium-deficiency (0.925:1) showed some deterioration of rate performance. Samples with a low or high Li:M ratio (0.925:1 or 1.075:1) showed some deterioration of cycling stability.

Discussion: The relatively broad preferred region, and the smooth change of electrochemical properties are caused by the gradual change of lithium chemical potential. Further, other properties including surface chemistry (by pH titration) were checked. A similar slight and continuous variation of properties depending on the Li:M ratio was observed.

Example 1

Preparation of LiCoO$_2$ with Fixed Lithium Chemical Potential 3.6 kg of inexpensive LiCoO$_2$ (received from a low-cost producer) and 400 g of commercial LiMn$_{1/3}$Ni$_{1/3}$Co$_{1/3}$O$_2$ were mixed by slow ball rolling, followed by a co-sintering at 900° C. for 10 hours in air. The samples was filled into vials (no sieving or grinding was required) shortly after cooling down and was stored and further processed in a dry room.

Figure 8:
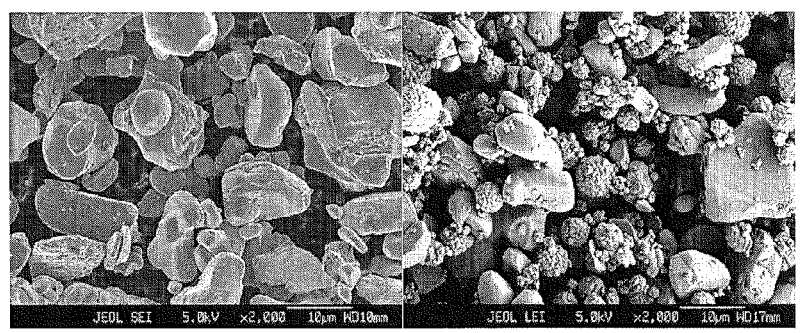
FIG. 8 is an FESEM (Field Emission Scanning Electron Microscope) image which shows (a) LiCoO$_2$ precursor powder, and (b) TR01 sample obtained by co-firing of 90% LiCoO$_2$ and 10% Li(Mn$_{1/3}$Ni$_{1/3}$Co$_{1/3}$)O$_2$ in Example 1.

FIG. 8 shows FESEM micrographs of the $LiCoO_2$ precursors and the final sample (Sample name: TR01). The morphology of TR01 was just the same as a mixture of the precursors. Particularly, $LiCoO_2$ and $LiMn_{1/3}Ni_{1/3}Co_{1/3}O_2$ were still separated particles and were not sintered into agglomerates. A temperature of 900° C. is high enough for a fast equilibration of lithium and oxygen chemical potentials. Therefore, the lithium potential of $LiCoO_2$ is fixed at a preferred value, which is determined by the lithium chemical potential of the lithium buffer. The value is above the low value for $LiCoO_2$ coexisting with the cobalt-oxide, and below the upper value for $LiCoO_2$ coexisting with $Li_2CO_3$. Furthermore, the $LiCoO_2$ was basically free of the cobalt oxide or $Li_2CO_3$ impurities. The absence of $Li_2CO_3$ impurities was confirmed by pH titration.

Experimental Example 1

Effects of Co-Firing

In order to confirm effects of heat-treatment in the present invention, the electrochemical properties of TR01 prepared in Example 1 were compared with a sample which is a mixture of 90 wt % of heated $LiCoO_2$ and 10 wt % of $LiMn_{1/3}Ni_{1/3}Co_{1/3}O_2$.

The sample was prepared in the same manner as in Sample TR01, except that two materials were not heat treated (co-fired). Table 4 below summarizes the results.

TABLE 4

|  | Capacity mAh/g) at C/5, | Capacity fading (% per 100 cycles) | |
| --- | --- | --- | --- |
| Samples (Li:M target) | 4.5 V, 50° C. | 4.5 V 25° C. | 4.5 V 50° C. |
| $LiCoO_2$—$LiMO_2$ mixture | 190 | 12% | 31% |
| TR01 (Example 1) | 187 | 2.0% | 6% |

The results of Table 4 showed that a simple mixing of $LiCoO_2$ with $LiMn_{1/3}Ni_{1/3}Co_{1/3}O_2$ without heat-treatment is not sufficient to achieve a high cycling stability at a high voltage.

Conclusion: A heat treatment is required to achieve equilibration of the lithium chemical potential.

Experimental Example 2

Coin-Cell Test

Figure 9:
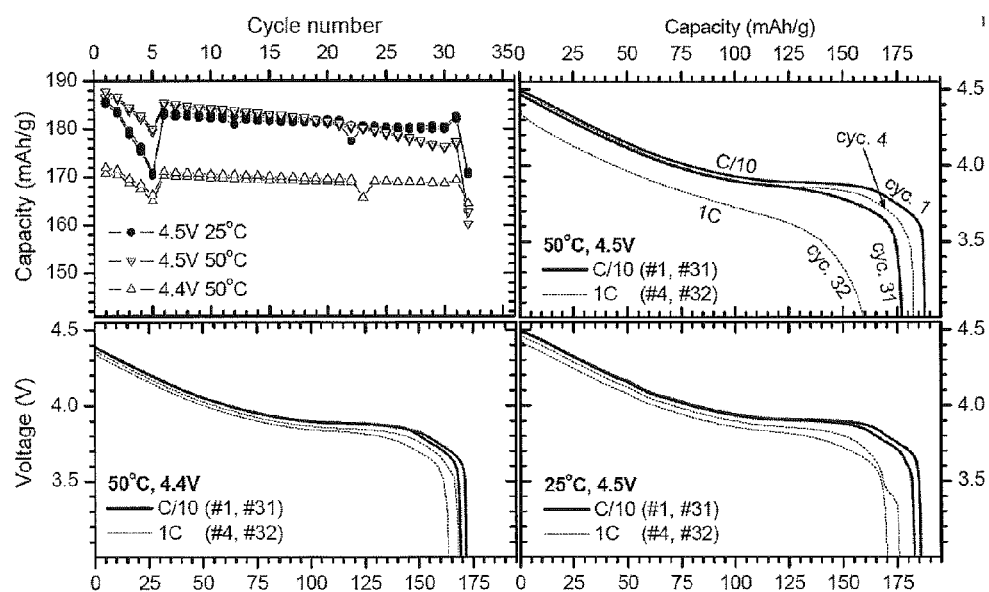
FIG. 9 is a graph showing cycling stability of a coin cell in Experimental Example 2, comprising TR01 sample as a cathode active material.

A cathode was prepared using Sample TR01 prepared in Example 1, as a cathode active material. Coin cells (with a Li metal anode) were prepared and were tested at 4.4 V and 4.5 V and at 25° C. and 50° C. FIG. 9 and Table 5 below summarize the obtained results.

TABLE 5

| | Capacity (mAh/g) at C/5 | | Capacity fading % per 100 cycles | | |
| --- | --- | --- | --- | --- | --- |
| Sample (Li:M target) | 4.4 V 25° C. | 4.5 V 50° C. | 4.4 V 50° C. | 4.5 V 25° C. | 4.5 V 50° C. |
| TR01 | 171 | 187 | 2.5% | 2.0% | 6% |

From the results given in Table 5 and FIG. 9, it can be seen that Sample TR01 of Example 1 (having the lithium chemical potential fixed in a preferred region) has improved cycling properties at an elevated voltage.

Comparative Example 1

Coin Cell Test Using Low-Price $LiCoO_2$

Except using low-price $LiCoO_2$ as a cathode active material, a coin cell was prepared in the same manner as in Experimental Example 2, and tested under the same conditions. $LiCoO_2$ used in this Example was the same product which was used as the precursor in Example 1. The low-price $LiCoO_2$ powder was heated to 900° C. and refreshed to have the same heat treatment history as Sample TR01 of Example 1. However, the above comparative sample was not subjected to the treatment to achieve the equilibration of the lithium chemical potential by the action of the lithium buffer.

Figure 10:
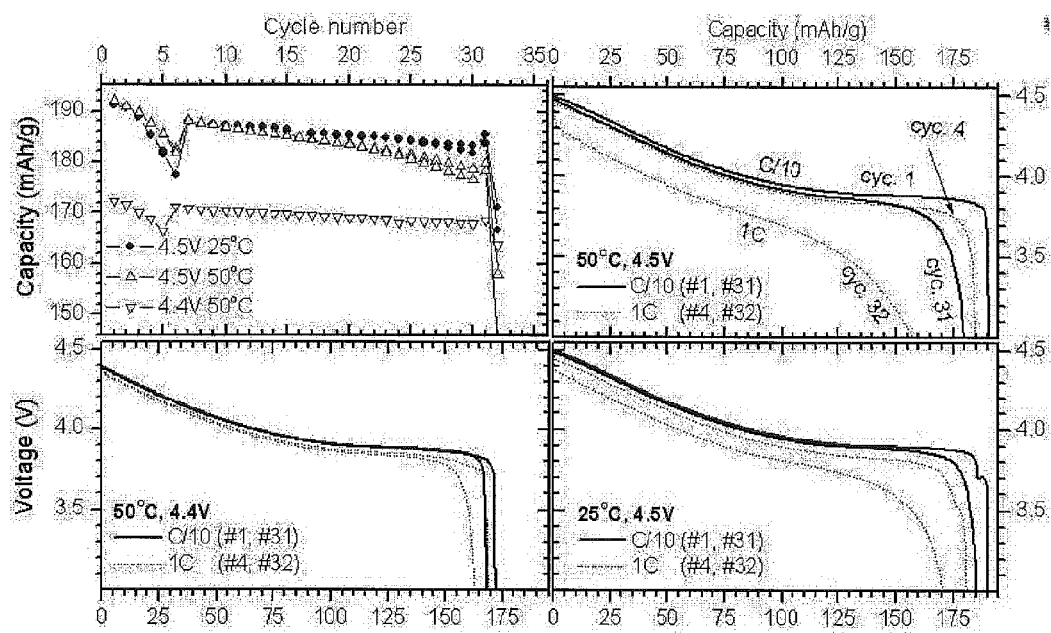
FIG. 10 is a graph showing cycling stability of a coin cell in Comparative Example 1, comprising inexpensive LiCoO$_2$ as a cathode active material.

As shown in FIG. 10, the comparative sample exhibited excellent stability through the heat treatment, which was, however, lower than that of Sample TR01 (see FIGS. 9 and 10).

In addition, it can be seen that the comparative sample exhibited a significant decrease of the capacity at 4.5 V, 50° C. as well as 4.5V, 25° C. (see C/10 data) and much more impedance built-up (see voltage depression of C/1).

Experimental Example 3

Polymer-Cell Test (Cycling Properties)

Commercial size polymer cells (3.6 mm thickness) were prepared at pilot plant scale. The polymer cells contained a cathode composed of 95 wt % TR01 (Example 1), 2.5 wt % PVDF binder and 2.5 wt % conductive additive (Super P), double side coated on 15 micrometer aluminum foil. The anode active material was commercial MCMB (Mesocarbon microbead). A standard commercial electrolyte (not containing overcharge additives) was used. The anode loading was chosen to achieve balanced cells at 4.4 V cell voltage (anode capacity=cathode capacity charged to 4.45 V versus $Li/Li^+$).

The polymer cells were cycled for 400 cycles (charge rate 0.6 C, discharge rate 1 C, 1 C=800 mA). Each 100th cycle was a "capacity check" cycle during which a slower charge/discharge rate (0.2 C) was applied. The cells were cycled at 3.0-4.2 V, 3.0-4.3 V, 4.0-3.5 V or 3.0-4.35 V. The cycling temperature was 23° C. or 45° C. Frequently the increase of thickness during extended cycling was checked. Furthermore, the evolution of resistance was checked by impedance measurement at 1000 Hz.

Figure 11:
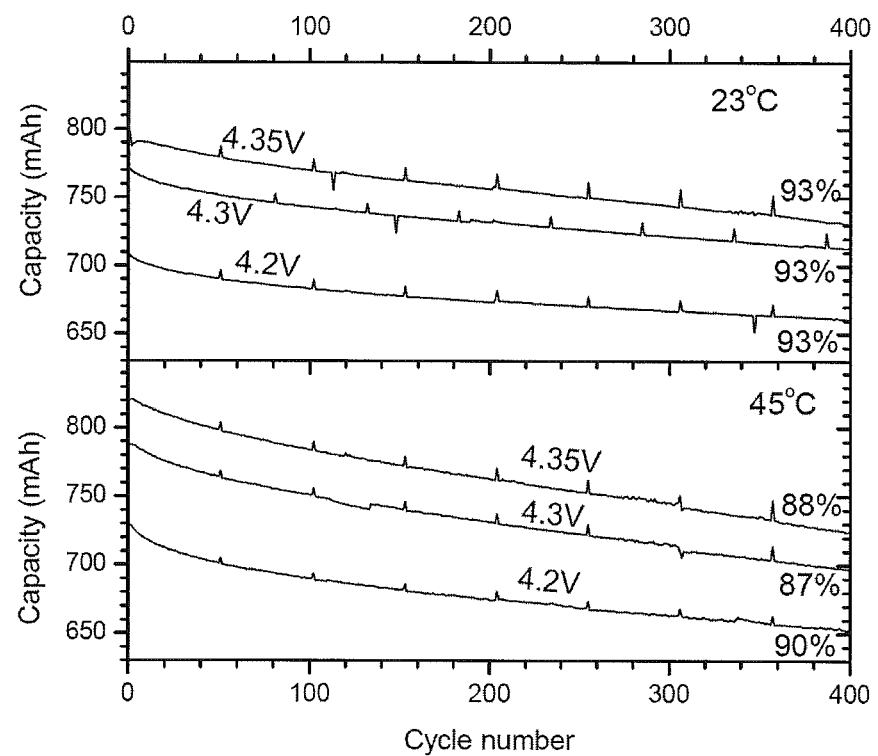
FIG. 11 is a graph showing cycling stability of a polymer cell in Experimental Example 3, comprising a cathode active material of TR01 (23° C., 45° C., 1 C rate (discharge)-0.6 C rate (charge), 3.0 V to 4.2 V, 3.0 V to 4.3 V, 3.0 V to 4.35 V, 3.0 V to 4.4 V, 400 cycling)

FIG. 11 shows the measurement results of cycling stability at 4.2, 4.3, 4.35 and 4.4 V at 23° C. and 45° C. Even at the high cell voltage of 4.4 V and at the elevated temperature of 45° C. a very high cycling stability without significant impedance built-up was observed.

More importantly, at 23° C. a similar rate of capacity loss was obtained for all voltages, and additionally, the capacity loss at C/1 and C/5 rates evolved similar patterns. Also at 45°

C., a similar behavior of capacity loss was observed for all voltages. Therefore, it can be concluded that the increase of cell voltage did not cause degradation of the cathode.

Table 6 below summarizes the obtained results.

TABLE 6

|  |  |  | Cycle 100 | Cycle 200 | Cycle 300 | Cycle 400 |
|---|---|---|---|---|---|---|
| Thickness | 23° C. | 4.2 V | 3.474/3.486 | 3.484/3.495 | 3.479/3.516 | 3.475/3.509 |
| (mm) |  | 4.3 V | 3.519/3.536 | 3.522/3.533 | 3.549/3.554 | 3.562/3.561 |
| 2 cells |  | 4.35 V | 3.563/3.567 | 3.599/3.624 | 3.617/3.604 | 3.628/3.60 |
| each | 45° C. | 4.2 V | 3.538/3.548 | 3.558/3.578 | 3.571/3.584 | 3.612/3.637 |
|  |  | 4.3 V | 3.611/3.610 | No data | 3.650/3.648 | 3.671/3.670 |
|  |  | 4.35 V | 3.607/3.626 | No data | 3.653/3.658 | 3.689/3.662 |
| Impedance | 23° C. | 4.2 V | 19.6/19.7 | 20.2/20.5 | 21.2/21.3 | 22.1/22.9 |
| 1 kHz |  | 4.3 V | 20.8/20.3 | 22.2/22.0 | 26.8/26.4 | 24.8/24.6 |
| mΩ |  | 4.35 V | No data | 22.9/22.8 | 25.1/24.5 | 25.0/24.6 |
| 2 cells | 45° C. | 4.2 V | 22.1/22.8 | 25.8/26.3 | 29.0/29.8 | 31.1/32.3 |
| each |  | 4.3 V | 24.6/25.1 | No data | 33.4/34 | 37.4/37.8 |
|  |  | 4.35 V | 25.3/25.6 | No data | 35.8/36.3 | 38.1/39.7 |

Conclusion: The obtained results clearly confirm that a modified $LiCoO_2$, with a lithium chemical potential fixed within a preferred region, has an improved excellent stability at high voltage (at least up-to 4.4 V versus $Li/Li^+$) even at elevated temperature (45° C.).

Experimental Example 4

Polymer-Cell Test (Storage Properties)

Polymer cells, prepared in the same manner as in Experimental Example 3, were charged to 4.2, 4.3 or 4.35 V. After charging, the cells were placed in a temperature chamber and the temperature was increased to 90° C. over 1 hour. Cells were kept at 90° C. for 4 hours, and then the temperature was decreased to room temperature over 1 hour. During the temperature profile, the cell thickness was automatically monitored. Before and after the test, the cell capacity was measured at C/1 and C/5 rates.

No significant increase of thickness was observed at any of the investigated charge voltages. Also, the recovery ratio did not decrease with an increased storage voltage. It can be concluded that the increase of cell voltage did not cause degradation of the cathode.

Table 7 below summarizes the results.

TABLE 7

|  | Thickness increase | Before (mAh) | | After (mAh) | | Recovery (%) | |
|---|---|---|---|---|---|---|---|
|  | (μm) | 1 C | 0.2 C | 1 C | 0.2 C | 1 C | 0.2 C |
| 4.2 V | <40 | 709 | 715 | 673 | 681 | 94.9 | 95.3 |
| 4.3 V | <30 | 773 | 779 | 739 | 752 | 95.7 | 96.5 |
| 4.35 V | <0 | 795 | 801 | 764 | 779 | 96.2 | 97.2 |

Conclusion: The obtained results clearly confirm that modified $LiCoO_2$, with a lithium chemical potential fixed at a preferred region, has improved, excellent storage properties at a high voltage (at least up-to 4.4 V versus $Li/Li^+$).

Comparative Example 2

Polymer Cell Test Using Low-Price $LiCoO_2$

Except using low-price $LiCoO_2$ as a cathode active material, a polymer cell was prepared in the same manner as in Experimental Example 3, and tested under the same conditions as Experimental Examples 3 and 4. However, the cell always showed much inferior stability at >4.3 V and always showed strong swelling during a 90° C. storage test.

Cells with standard commercial $LiCoO_2$ exhibited smooth cycling at 4.2-4.25 V, but at 4.3-4.35 V an increased rate of capacity loss was observed simultaneously with a stronger built-up of capacity difference (=impedance built-up). This behavior was caused by the lack of cycling stability of $LiCoO_2$ at voltages>4.3 V versus $Li/Li^+$.

Example 2

Preparation of $LiCoO_2$ with Core-Shell Structure (1) Experimental Examples 2, 3 and 4 demonstrate that modified $LiCoO_2$ with a lithium chemical potential fixed in a preferred region, obtained by co-sintering with a solid state lithium buffer, allows to obtain excellent storage properties and high-voltage cycling properties. This actual example modifies this approach. The $LiCoO_2$ (having a lithium chemical potential fixed in a preferred region) is present in the core of particles, covered by a shell of the solid state lithium buffer. This concept is useful to further improve safety properties.

(2) A layer of $M(OH)_2$ ($M=Mn_{1/2}Ni_{1/2}$) was precipitated onto $LiCoO_2$ particles acting as seeds during the precipitation process. During precipitation, a flow of an aqueous $MSO_4$ solution (2M) and a flow of an aqueous NaOH solution (4M) were added to a reactor (5 L) containing 5 kg of $LiCoO_2$ in the form of a water-based slurry (Volume=2.7 L). The pH was adjusted to be within a preferred region, and the temperature was about 85° C. The total time of precipitation was 165 min. A total of 0.06 mol transition metal was precipitated per 1 mol of $LiCoO_2$. After the precipitation, the slurry was filtered and washed, and the resulting powder cake was aged overnight in 10 L of an aqueous 0.5M LiOH solution, followed by washing and drying at 180° C. The thus-obtained powder (name: Precursor 1) was used as a precursor for the preparation of a final cathode material.

(3) To find optimum preparation conditions, a series of small scale samples was prepared and electrochemically tested at 4.4, 4.5 and 4.6 V and at 25° C. and 60° C., respectively. Samples had varying Li contents and were prepared by adding small amounts of $Li_2CO_3$ to Precursor 1, followed by heat treatment at 900° C. for 5 hours. In some cases, a small amount of fluorine ($Li_3AlF_6$, 0.2 mol % Al per 1 mol of Co) was also added prior to the heat treatment.

(4) Finally, a large sample (volume size: 4 kg, name: 4 kg-Final) was prepared by adding 48 g of $Li_2CO_3$ and 20.5 g of a 2:1 mixture of $Li_3AlF_6$ and $Li_2CO_3$ to 4 kg of Precursor 1, followed by heat treatment at 900° C. for 6 h. Coin cells were prepared using the thus-obtained samples and were tested at 4.4, 4.5 and 4.6 V at 25° C. as well as at 60° C.

Figure 12:
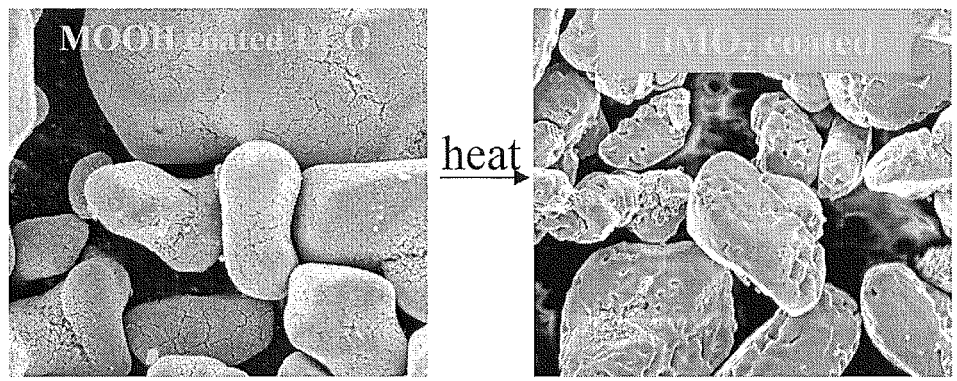
FIG. 12 is an FESEM image which shows a precursor sample (Precursor 1) and the resulting electrode active material (4 kg-Final) in Example 2.
Figure 13:
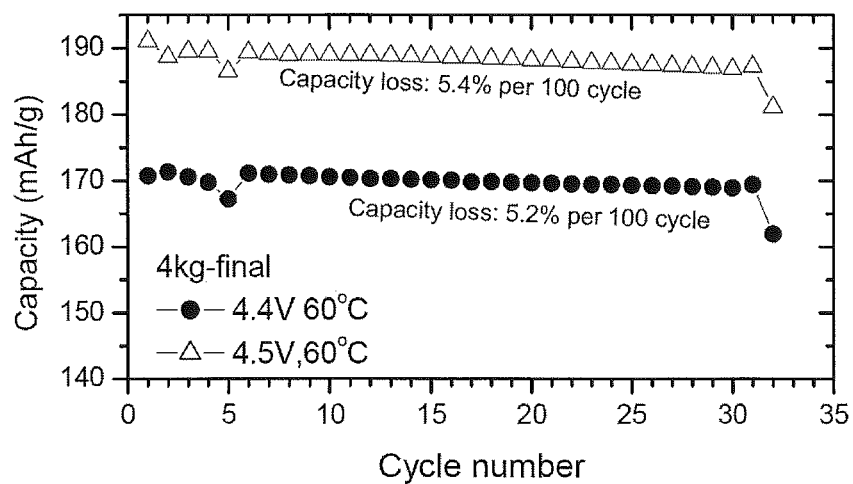
FIG. 13 a graph showing cycling stability of electrode active material in Example 2, wherein the core of LiCoO$_2$ is fully covered by the shell of solid state lithium buffer.

FIG. 12 shows an FESEM micrograph of the thus-prepared cathode active material with a core-shell structure. Apparently, a shell of solid state lithium buffer fully covers the $LiCoO_2$ core. FIG. 13 shows test results of the cycling stability. High stability during cycling at high voltage and elevated temperature has been demonstrated. The cycling stability was much improved, as compared with the results of state of the art $LiCoO_2$.

INDUSTRIAL APPLICABILITY

According to the present invention, $LiCoO_2$ having a stoichiometric composition can be prepared by co-firing with a material acting as a Li acceptor and/or a Li donor, thus fixing a lithium chemical potential within the preferred range. As a result, it is possible to prepare a $LiCoO_2$ electrode active material which has improved high-temperature storage properties and high-voltage cycling properties, and is robust to composition fluctuation in the production process.

Therefore, the present invention can spend less time and labor to quality control and process management in the mass-production of the electrode active material, and the production costs of $LiCoO_2$ can be cut down.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A $LiCoO_2$-containing powder comprising:
a co-fired mixture containing a $LiCoO_2$ and a lithium buffer material,
wherein the lithium buffer material is a material of the Formula $Li_zMO_2$, wherein z is between 0.95 and 1.1; M is $Ni_{1-x-y}Mn_xCo_y$; y is an amount of up to 0.5; and a ratio of (x/(1−x−y)) is in a range of 0.4 to 1.1,
wherein the $LiCoO_2$ has a stoichiometric composition having a Li:Co ratio of 1:1 via heat treatment of the $LiCoO_2$ and the lithium buffer material to make an equilibrium with respect to a lithium chemical potential there between,
wherein the lithium chemical potential of the $LiCoO_2$ is fixed, and the lithium chemical potential is higher than an equilibrium lithium chemical potential between the $LiCoO_2$ and a cobalt oxide and the lithium chemical potential is lower than an equilibrium lithium chemical potential between lithium cobalt oxide and $Li_2CO_3$.

2. The $LiCoO_2$-containing powder according to claim 1, wherein the lithium buffer material is a material that withdraws Li from $Li_2CO_3$, which is present in a Li-excess form of $LiCoO_2$, or supplies Li to a cobalt oxide, which is present in a Li-deficient form of $LiCoO_2$.

3. The $LiCoO_2$-containing powder according to claim 1, wherein the lithium buffer material is $LiMn_{1/3}Ni_{1/3}CO_{1/3}O_2$.

4. The $LiCoO_2$-containing powder according to claim 1, produced by a method comprising heat-treating at a heat treatment temperature which is lower than a temperature at which the $LiCoO_2$ and the lithium buffer material form a new compound.

5. The $LiCoO_2$-containing powder according to claim 4, wherein the heat treatment temperature is in the range of 400 to 1100° C.

6. The $LiCoO_2$-containing powder according to claim 1, wherein the content of lithium cobalt oxide is at least weight percent, based on the total weight of the $LiCoO_2$-containing powder.

7. The $LiCoO_2$-containing powder according to claim 1, wherein the lithium cobalt oxide contacts the lithium buffer material.

8. The $LiCoO_2$-containing powder according to claim 1, further comprising a core-shell structure, wherein a core comprises the lithium cobalt oxide and a shell comprises the lithium buffer material.

9. The $LiCoO_2$-containing powder according to claim 1, which is prepared on the scale of at least 1 kg batch.

10. The $LiCoO_2$-containing powder according to claim 1, which is prepared on the scale of at least 20 kg batch.

11. A cathode active material for a rechargeable battery comprising the $LiCoO_2$-containing powder according to claim.

12. An electrode comprising the powder of claim 1.

13. A rechargeable battery comprising the electrode of claim 12.

14. The $LiCoO_2$-containing powder of claim 1, wherein z is from 0.975 to 1.025.

15. A $LiCoO_2$-containing powder comprising:
a co-fired mixture containing $LiCoO_2$ and a lithium buffer material,
wherein the $LiCoO_2$-containing powder has a constant lithium chemical potential, wherein the $LiCoO_2$ coexists with the lithium buffer material under equilibrium conditions of lithium chemical potential there between and the $LiCoO_2$ has a stoichiometric composition having a Li:Co ratio of 1:1 via heat treatment, and the lithium chemical potential is higher than an equilibrium lithium chemical potential between $LiCoO_2$ and a cobalt oxide and the lithium chemical potential is lower than an equilibrium lithium chemical potential between $LiCoO_2$ and $Li_2CO_3$,
wherein the lithium buffer material is a material of the Formula $Li_zMO_2$, wherein z is between 0.95 and 1.1; M is $Ni_{1-x-y}Mn_xCo_y$; y is an amount of up to 0.5; and a ratio of (x/(1-x-y)) is in a range of 0.4 to 1.1.

16. The $LiCoO_2$-containing powder of claim 15, wherein z is from 0.975 to 1.025.

17. A method for preparing the $LiCoO_2$-containing powder of claim 1, comprising a step of providing a homogeneous mixture of $LiCoO_2$ and a lithium buffer material; and a step of heating the mixture to achieve equilibration of a lithium chemical potential.

18. The method according to claim 17, wherein the homogeneous mixture has a core-shell structure that the lithium buffer material covers the surface of $LiCoO_2$.

19. The method according to claim 17, wherein the heat treatment temperature is lower than the temperature at which the reaction between the $LiCoO_2$ and the lithium buffer material takes place to form a new compound.

20. The method according to claim 17, wherein the heat treatment temperature is in the range of 400 to 1100° C.

* * * * *

UNITED STATES PATENT AND TRADEMARK OFFICE
CERTIFICATE OF CORRECTION

| | | |
|---|---|---|
| PATENT NO. | : 8,932,480 B2 | Page 1 of 1 |
| APPLICATION NO. | : 12/968706 | |
| DATED | : January 13, 2015 | |
| INVENTOR(S) | : Jens M. Paulsen et al. | |

It is certified that error appears in the above-identified patent and that said Letters Patent is hereby corrected as shown below:

In the claims,

Column 10, line 5, after "least" insert --40--.

Signed and Sealed this
Twenty-third Day of February, 2016

Michelle K. Lee
*Director of the United States Patent and Trademark Office*